(12) United States Patent
Kim

(10) Patent No.: US 7,895,458 B2
(45) Date of Patent: Feb. 22, 2011

(54) POWER CONTROL APPARATUS AND METHOD THEREOF

(75) Inventor: Dong Han Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 735 days.

(21) Appl. No.: 11/843,758

(22) Filed: Aug. 23, 2007

(65) Prior Publication Data

US 2008/0178031 A1  Jul. 24, 2008

(30) Foreign Application Priority Data

Jan. 23, 2007  (KR) .................. 10-2007-0006903

(51) Int. Cl.
*G06F 1/00* (2006.01)
(52) U.S. Cl. .................. 713/330; 713/300; 713/310; 713/320; 713/321; 713/322; 713/323; 713/324; 713/340; 326/95; 326/98
(58) Field of Classification Search .................. 713/300, 713/310, 320–324, 330, 340; 326/95, 98
See application file for complete search history.

(56) References Cited

U.S. PATENT DOCUMENTS 7,002,834 B2 * 2/2006 Yokozeki .................. 365/145
7,248,080 B1 * 7/2007 Doyle .......................... 326/95
7,498,845 B1 * 3/2009 Doyle .......................... 326/95
2004/0208046 A1 * 10/2004 Yokozeki .................. 365/145

FOREIGN PATENT DOCUMENTS

| JP | 2000-013215 | 1/2000 |
| KR | 1998-086446 | 12/1998 |
| KR | 1020020007147 | 1/2002 |
| KR | 1020030062218 | 7/2003 |

* cited by examiner

*Primary Examiner*—Abdelmoniem Elamin
(74) *Attorney, Agent, or Firm*—F. Chau & Associates, LLC

(57) ABSTRACT

A power control apparatus including an active block in which power is always maintained in an on state and an N number of power management units having a hierarchical structure where N is a natural number greater than or equal to 1. Each of the power management units controls power of at least one power domain block Power of a first power management unit of the N number of the power management units is controlled by the active block, and power of an $N^{th}$ power management unit of the N number of the power management units is controlled by an $(N-1)^{th}$ power management unit.

12 Claims, 4 Drawing Sheets

POWER CONTROL APPARATUS AND METHOD THEREOF

CROSS-REFERENCE TO RELATED PATENT APPLICATIONS

This application claims priority under 35 U.S.C. §119 from Korean Patent Application No. 2007-0006903 filed on Jan. 23, 2007, the disclosure of which is incorporated by reference herein,

BACKGROUND OF THE INVENTION

1. Field of the Invention

The present disclosure relates to a power control apparatus, and more particularly, to a power control apparatus having top-own type hierarchical power control units, and a control method thereof.

2. Discussion of the Related Art

Minimal power consumption has become more an issue as electronic devices are smaller and more highly integrated. In particular, in the field of mobile communications system on chip (SOC), the reduction in the threshold voltage of a transistor through a refined process helps in the reduction of dynamic power. A method of maintaining minimum necessary information using multi threshold CMOS (MTCMOS) has been proposed in which, in the idle state, power is supplied only to blocks that need power while little or no power is supplied to blocks that do not need power.

FIG. 1 is a functional block diagram of a conventional power control apparatus using an MTCMOS. Referring to FIG. 1, a conventional power control apparatus 10 using an MTCMOS includes a power management unit 5 and a plurality of power domain blocks 6, 7, and 8.

Each of the power domain blocks 6-8 can be a set of hardware and/or modules divided by functions or operation modes. For example, for the mobile communications SOC, each set of functional modules can perform a multimedia function, a dual mode, a DMB function, or a DVB-H function can configure a different power domain block.

Each of the power domain blocks 6-8 can include at least one floating prevention circuit (FPC) 9. The structure and role of the FPC 9 is disclosed in detail in Korean Registration Patent Publication No. 10-054634 entitled "MTCMOS Circuit System having FPC" which is included herewith as a reference.

Also, the power management unit 5 includes a state machine 1 to control the MTCMOS controllers 2, 3, and 4. However, since the conventional power management unit 5 needs to control the power of the power domain blocks 6-8, the design of the power management unit 5 becomes complicated. Thus, there may need to be more area allocated to the power management unit and therefore, there may be more leakage current due to the power management unit itself.

SUMMARY OF THE INVENTION

An exemplary embodiment of the present disclosure may be comprised of a power control apparatus further comprised of an active block in which power is always maintained in an power-on state and N number of power management units having a hierarchical structure where N is a natural number greater than or equal to 1. Each of the power management units may control power of at least one power domain block. Power of a first power management unit of the N number of the power management units may be controlled by the active block, and power of an $N^{th}$ power management unit of the N number of the power management units may be controlled by an $(N-1)^{th}$ power management unit.

Each of the power management units may further be comprised of an MTCMOS controller controlling power of the at least one power domain block corresponding to each of the power management units, or power of a lower power management unit of each of the power management units and a state machine controlling the MTCMOS controller.

The state machine may further be comprised of a floating prevention circuit (FPC) temporarily storing information stored in the state machine when the state machine is even in a power-off state and outputting the stored information to the active block or a higher power management unit of the power management unit having the state machine.

The MTCMOS controller may be further comprised of a floating prevention circuit (FPC) temporarily storing information stored in the MTCMOS controller when the MTCMOS controller is even in a power-off state and outputting the stored information to a lower power management unit of the power management unit having the MTCMOS controller.

Each of the power management units may further be comprised of a floating prevention circuit (FPC) temporarily storing information stored in each of the power management units when each of the power management units is even in a power-off state and outputting the stored information to the at least one power domain block controlled by each of the power management units.

Each of the power management units may output a request signal requesting information about a state of each of the at least one power domain blocks to each of the at least one power domain blocks controlled by each of the power management units, receive a response signal output from each of the at least one power domain block in response to the request signal, and output a control signal controlling power of each of the at least one power domain block based on the received response signal.

To wake up the at least one power domain block controlled by a lower power management unit of the power management unit having the state machine, the state machine may outputs a wake-up signal to the state machine in the lower power management unit.

When the power management unit having the state machine enters a power-off state the state machine may output a power-off signal to the state machine in a higher power management unit of the power management unit having the state machine.

The state machine may receives the response signal and may output a first controller control signal to the MTCMOS controller to control the power of each of the at least one power domain block based on the received response signal.

The state machine may further output a second controller control signal to the MTCMOS controller to wake up the lower power management unit and the MTCMOS controller may output a second control signal to wake-up the lower power management unit in response to the second controller control signal.

An exemplary embodiment may further be comprised of a portable terminal comprised of a power control apparatus and a CPU receiving power controlled by the power control apparatus. The portable terminal may be a PDA, cellular phone, media player, wireless computer peripheral, or wireless remote control.

An exemplary embodiment may further comprise a method of controlling a power control apparatus with N number of power management units having a hierarchical structure where N is a natural number greater than 1. The method may be comprised of an active block in which power is always maintained in an power-n state waking-up a first power management unit to wake-up at least one first power domain block controlled by the first power management unit and the first power management unit waking-up a second power management unit to wake-up at least one second power domain block.

An exemplary embodiment may further comprise a method of controlling a power control apparatus with N number of power management units having a hierarchical structure where N is a natural number greater than 3. The method may be comprised of an $N^{th}$ power management unit outputting a first power-off signal to an $(N-1)^{th}$ power management unit when at least one $N^{th}$ power domain block controlled by the Nth power management unit is all powered-off and receiving the first power-off signal, and the $(N-1)^{th}$ power management unit outputting a second power-off signal to an $(N-2)^{th}$ power management unit when an $(N-1)^{th}$ power control domain block is all powered-off.

DETAILED DESCRIPTION OF THE EXEMPLARY EMBODIMENTS

Figure 1:
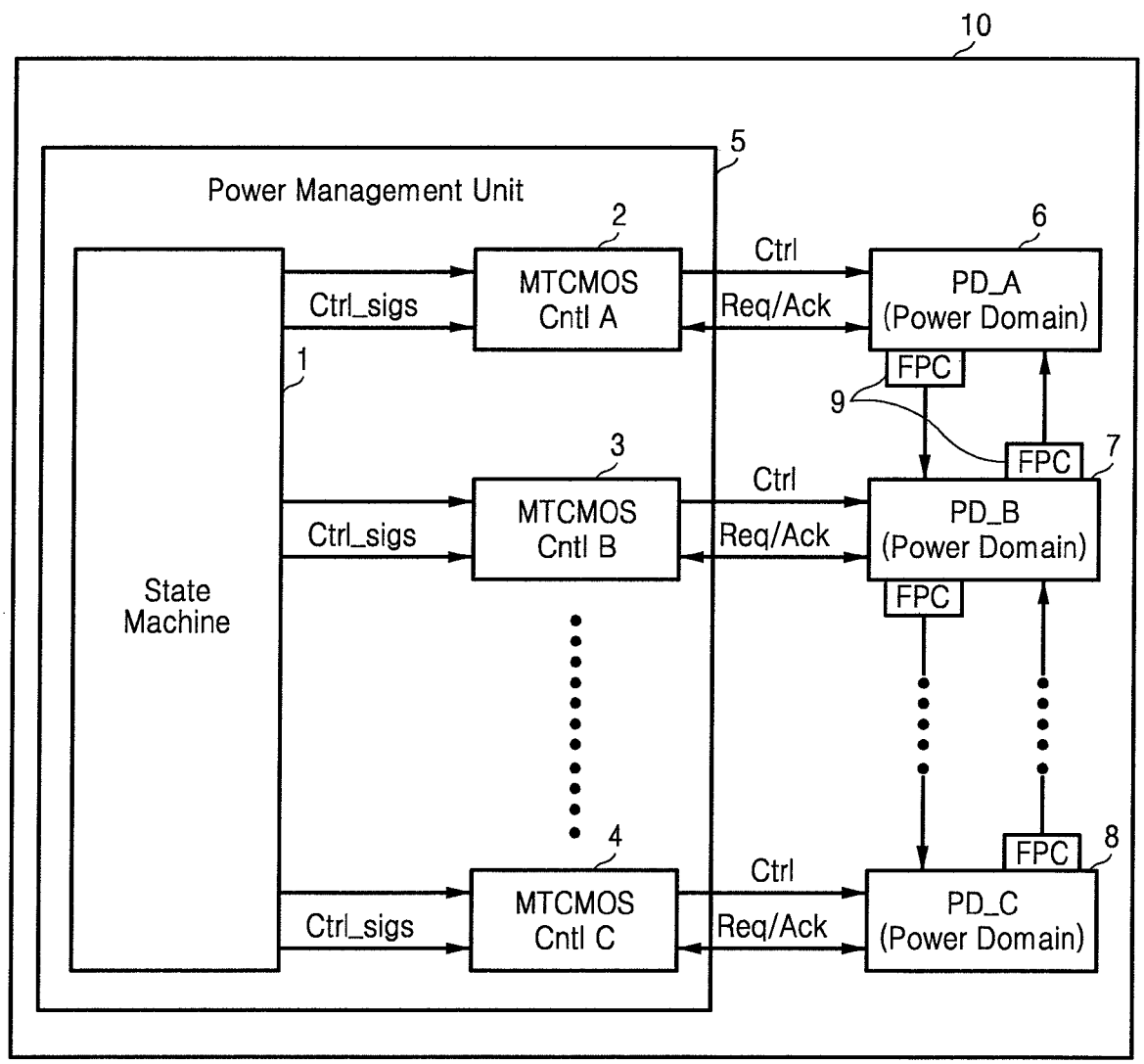
FIG. 1 a functional block diagram of the conventional power control apparatus using an MTCMOS.

Hereinafter, exemplary embodiments of the present disclosure will be described in detail with reference to the attached drawings. In the drawings, like numbers refer to like elements throughout.

Figure 2:
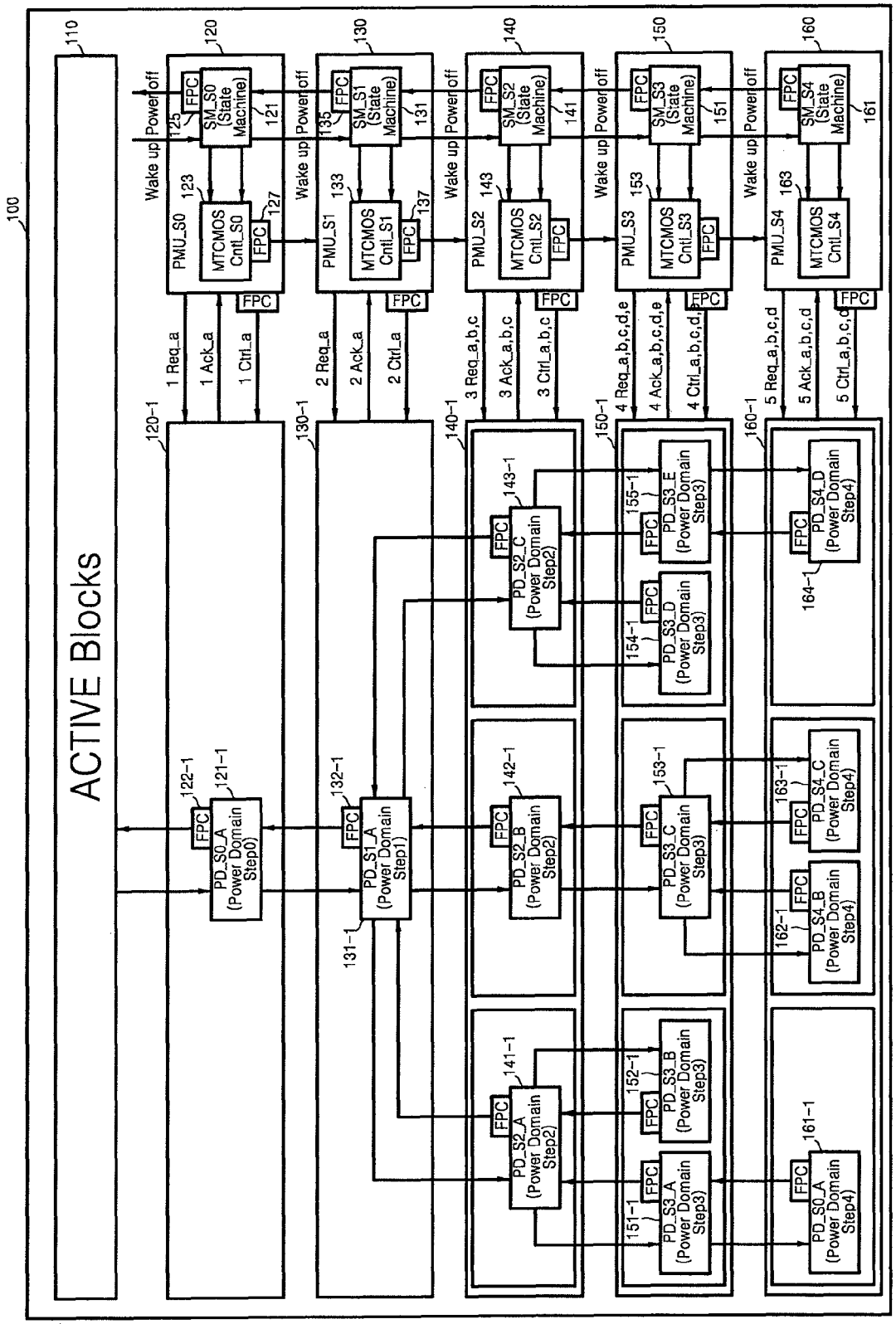
FIG. 2 is a functional block diagram of a power control apparatus according to an embodiment of the present disclosure.

FIG. 2 is a functional block diagram of a power control apparatus according to an exemplary embodiment of the present disclosure. Referring to FIG. 2, a power control apparatus 100 according to the exemplary embodiment may be realized to include an active block 110 having power that is always maintained in an on state and N number of power management units 120, 130, 140, 150, and 160 having a hierarchical structure, where N is a natural number greater than or equal to 1. Although FIG. 2 illustrates an example in which N is 5, the present invention is not limited thereto.

The power control apparatus 100 is suitable for use in portable terminals, such as mobile phones, PDAs, media players, wireless computer peripheral, or wireless remote control (not shown). The active block 110 can be the minimum block having power that is always maintained in an on state. Moreover, the active block 110 can be a block that is always operated in a standby state. The real time clock (RTC), the general purpose input/output (GPIO), or the hard macro which always require power even in a standby state can be included in the active block 110.

Each of the power management units 120-160 may control the power of at least one of power domain blocks 121-1, 131-1, 141-1, 142-1, 143-1, and so forth. For example, the first power management unit 120 may control the power of at least one power domain block 121-1 included in a first state power domain 120-1 corresponding to the first power management unit 120. Also, the third power management unit 140 may control the power of at least one of the power domain blocks 141-1, 142-1, and 143-1 included in a third state power domain 140-1 corresponding to the third power management unit 140.

The power of the respective power management units 120-160 may be hierarchically controlled Moreover, the power of the first power management unit 120 of the N number of the power management units 120-160 is controlled by the active block 110 while the power of the $N^{th}$ power management unit of the N number of the power management units 120-160 is controlled by the $(N-1)^{th}$ power management unit.

For example, when N is 5 as shown in FIG. 2, the second power management unit 130 may be controlled by the first power management unit 120, the third power management unit 140 may be controlled by the second power management unit 130, the fourth power management unit 150 may be controlled by the third power management unit 140, and the fifth power management unit 160 may be controlled by the fourth power management unit 150.

The N state power domains 120-1, 130-1, 140-1, 150-1, and 160-1 including the power domain blocks 121-1, 131-1, 141-1, 142-1, and so forth may have a hierarchical structure. The first state power domain 120-1 at the top position may include a apparatus capable of controlling a system including the power control apparatus 100, for example, a master CPU.

The second state power domain 130-1 includes a apparatus that is commonly used by the system, for example, a common bus. The third state power domain 140-1 includes the power domain blocks 141-1, 142-1 and 143-1 which are functionally divided. For example, the power domain block 141-1 can be an apparatus corresponding to a multimedia function, the power domain block 142-1 can be a apparatus corresponding to a dual mode function, and the power domain block 143-1 can be a apparatus corresponding to a DVB-H function. When the multimedia function is used, the power domain block 141-1 is in a power-on state while the power domain blocks 142-1 and 143-1 are in a power-off state since the apparatus correspond to the dual mode function and the DVB-H function is in a standby state.

Also, each of the fourth and fifth state power domains 150-1 and 160-1 may include apparatus corresponding to the detailed functions of the power domain blocks 141-1, 142-1 and 143-1 included in the third state power domain 140-1. Each power domain block may be able to exchange necessary data and the number and structure of the states of the power domain may be variable.

Each of the power management units 120-160 may include the MTCMOS controllers 123 and 133 controlling the power of a lower power management unit of each of the power management units 120-160 or at least one of the power domain blocks 121-1, 131-1 and so forth corresponding to the respective power management units 120-160 and state machines 121, 131, and so forth.

Since the operational principles of the respective state machines 121, 131, and so forth are similar, the operational principle of the first state machine 121 is described as follows. The active block 110 may receive an interrupt signal input from the outside and may output a wake-up signal to the first state machine 121 in response to the received interrupt signal. Then, the first state machine 121 may output a first controller control signal to the first MTCMOS controller 123.

The first controller control signal may be a control signal output by the respective state machines 121, 131, and so forth to the MTCMOS controller to control the power supplied to at least one power domain block. Also, a second controller control signal may be a control signal output by the respective state machines 121, 131, and so forth to the MTCMOS controller to control the power supplied to a lower power management unit.

The first MTCMOS controller 123 in response to the first controller control signal may output a predetermined control signal to the MTCMOS (not shown) included in the power domain block 121-1 so that power can be supplied to the power domain block 121-1 that is controlled by the first MTCMOS controller 123. Thus, the active block 110 may include an additional power management unit (not shown) to output the wake-up signal to the first state machine 121 and to supply power to the first power management unit 120.

To wake-up the second power management unit 130 that is a lower power management unit, the first state machine 121 may output a wake-up signal to the second state machine 131 and the second controller control signal to the first MTCMOS controller 123. Then, the first MTCMOS controller 123 in response to the second controller control signal may output a predetermined control signal to the MTCMOS (not shown) included in the second power management unit 130 so that power can be supplied to the second power management unit 130.

The state machines 121-161 respectively included in the power management units 120-160 may output request signals 1Req_a, 2Req_a, 3Req_a,b,c, and so forth requesting information on the state of each of at least one power domain block to the at least one of the power domain blocks 121-1, 131-1, and so forth that are respectively controlled by the power management units 120-130.

In response to the request signal, the at least one of the power domain blocks 121-1, 131-1, and so forth output response signals 1Ack_a, 2Ack_a, 3Ack_a,b,c, and so forth to the state machines 121-161. The state machines 121-161 receiving the output response signals may produce control signals 1Ctrl_a, 2Ctrl_a, 3Ctrl_a,b,c, and so forth controlling the power of the at least one of the power domain blocks based on the response signal.

When the power management units 120-160 including the state machines 121-161 enter a power-off state, the state machines 121-161 may output a power-off signal to the state machines included in the higher power management unit of the power management units 120-160 of the state machines 121-161.

For example, the fourth state machine 151 can be based on a request signal 4Req_a,b,c,d and a response signal 4Ack_a,b,c,d,e whether all operations of the power domain blocks 151-1, 152-1, 153-1, 154-1, and 155-1 of the fourth state machine 151 are complete. When all of the operations of the power domain blocks 151-1, 152-1, 153-1, 154-1, and 155-1 are complete, the fourth state machine 151 may output a power-off signal to the third state machine 141. The third state machine 141 may control the 3MTCMOS controller 143 so that the fourth power management unit 150 can be powered off. The fourth power management unit 151 may then enter a power-off state.

The state machines 121-161 may temporarily store information stored in the state machines 121-161 in the power-off state and may include the first floating prevention circuits (FPCs) 125, 135, and so forth to output the stored information to the higher power management unit of the power management units 120-160 having the state machines 121-161.

The FPC may interface the block in the power-on state and the block in the power-off state and prevent short-circuit current that may be generated in the standby state. The FPC may include a latch (not shown) so that, in the power-off state, information present just before the power off can be temporarily stored. The structure and operational principle of the FPC are disclosed in detail in Korean Registration Patent Publication No, 10-054634 entitled "MTCMOS Circuit System Having Short-Circuit Current Prevention Circuit" and Korean Registration Patent Publication No. 10-0564588 entitled "MTCMOS Semiconductor Integrated Circuit Having Floating Prevention Circuit" which is incorporated by reference herein. Each of the MTCMOS controllers 123, 133, and so forth and each of the power management units 120-160 may include the FPC. Also, each of the power domain blocks 121-1, 131-1, and so forth may include the FPC.

Figure 3:
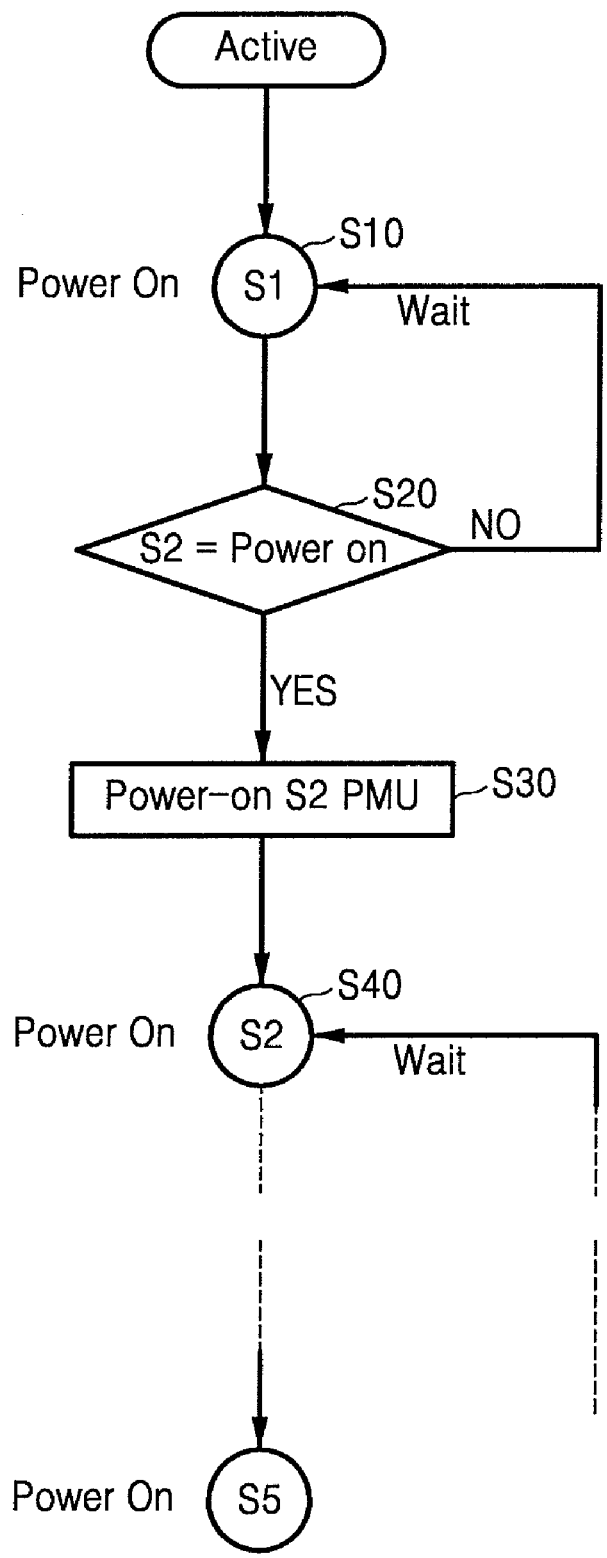
FIG. 3 is a flow chart for explaining the step in which the power management units are powered on step by step in a power control method according to an embodiment of the present disclosure.

FIG. 3 is a flow chart for explaining the step in which the power management units may be powered-on in a power control method according to an exemplary embodiment of the present disclosure. Referring to FIGS. 2 and 3, in response to the wake-up signal output from the active block 110, the first state machine 121 and the first power management unit 120 may be powered on and the power state is the first power state (S10). The N power state means that the first through $N_{th}$ power management units are powered on.

The first state machine 121 may determine whether to wake up the second power management unit 130 (S20). When the wake-up is the determined result, there may be a power-on request signal of the tower power domain block, for example, 131-1, from the power domain block 121-1 controlled by the first state machine 121, the wake-up signal may be output to the second state machine 131 to wake up the second power management unit 130 and the first MTCMOS controller may be controlled to supply the power of the second power management unit 130 (S30). Next, the power state may be the second power state (S40). The power state can enter the next power state under control of the higher power management unit step by step.

Figure 4:
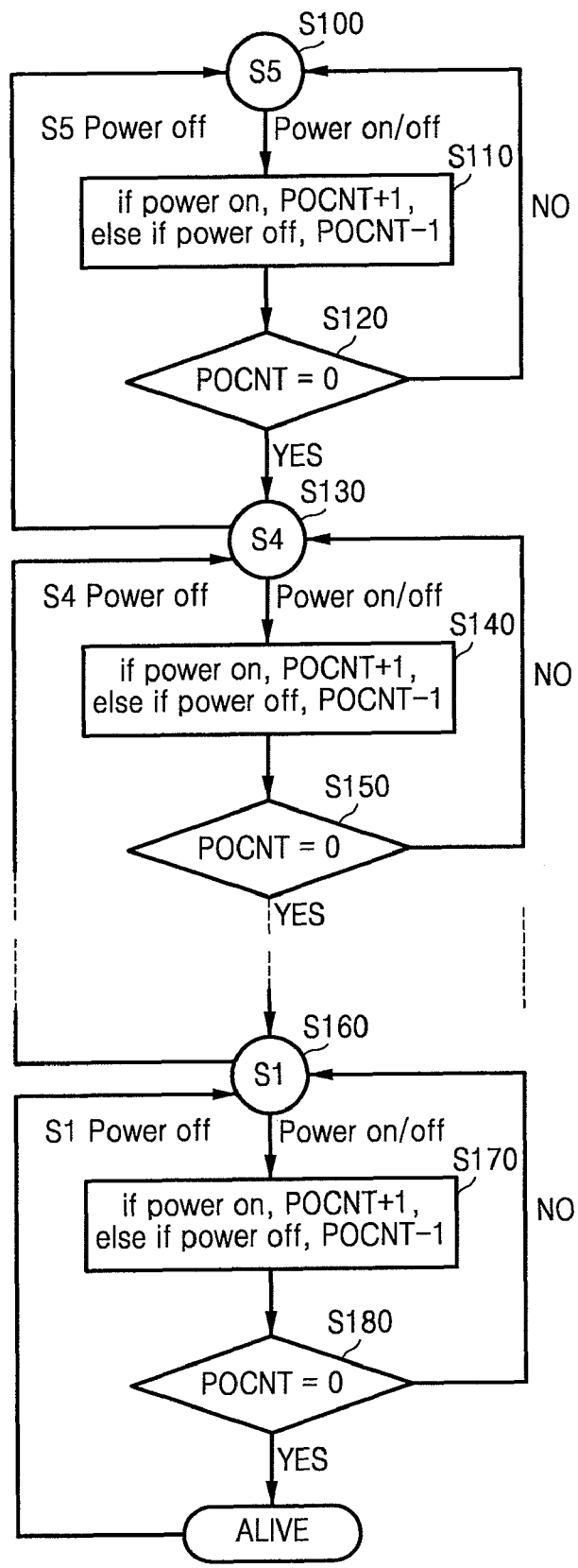
FIG. 4 is a flow chart for explaining the step in which the power management units are powered off step by step in the power control method according to an embodiment of the present disclosure.

FIG. 4 is a flow chart for explaining the steps in which the power management units are powered off in the power control method according to an exemplary embodiment of the present disclosure. Referring to FIGS. 2 and 4, when the power state is in the fifth power state (S100), the fifth power management unit 160 may turn on/off the power of at least one of power domain blocks 161-1, 162-1, 163-1, and 164-1 under control of the fifth state machine 161.

According to the power on/off, the fifth state machine 161 may change the value of a variable, for example, POCNT, indicating the number of the power domain blocks in the power-on state of the power domain blocks 161-1-164-1 controlled by the fifth state machine 161 (S110). When the value of the variable is "0", that is, when the power domain blocks 161-1-164-1 controlled by the fifth state machine 161 are all in the power off state (S120), the fifth state machine 161 may output a power-off signal to the fourth state machine 151.

The fourth state machine 151 in response to the power-off signal may control the 4MTCMOS controller 153 to power off the fifth power management unit 160. The power state may next enter the fourth power state (S130). In the fourth power state, the fourth power management unit 150 may be sequentially powered off in a method similar to the above-described method. The power state may next enter the first power state (S160).

As described above, the power control apparatus and method according to the present disclosure, the power management unit may be hierarchically divided in a top-down method so that the power control may be performed for each power state, thus improving the effect of the power control. Also, the integrity of the power management unit can be readily verified.

While this disclosure has been particularly shown and described with reference to preferred embodiments thereof, it will be understood by those skilled in the art that various changes in form and details may be made therein without departing from the spirit and scope of the invention as defined by the appended claims.

What is claimed is:

1. A power control apparatus comprising:
an active block in which power is maintained in a power-on state; and
an N number of power management units having a hierarchical structure where N is a natural number greater than or equal to 1,
wherein each of the power management units controls power of at least one power domain block, power of a first power management unit of the N number of the power management units is controlled by the active block, and power of an Nth power management unit of the N number of the power management units is controlled by an (N−1)th power management unit,
wherein each of the power management units comprises:
an MTCMOS controller that controls power of the at least one power domain block corresponding to each of the power management units or power of a lower power management unit of each of the power management units; and
a state machine that controls the MTCMOS controller,
wherein the state machine comprises a floating prevention circuit (FPC) temporarily storing information stored in the state machine when the state machine is even in a power-off state and outputting the stored information to the active block or a higher power management unit of the power management unit having the state machine.

2. A power control apparatus comprising:
an active block in which power is maintained in a power-on state; and
an N number of power management units having a hierarchical structure where N is a natural number greater than or equal to 1,
wherein each of the power management units controls power of at least one power domain block, power of a first power management unit of the N number of the power management units is controlled by the active block, and power of an Nth power management unit of the N number of the power management units is controlled by an (N−1)th power management unit,
wherein each of the power management units comprises:
an MTCMOS controller that controls power of the at least one power domain block corresponding to each of the power management units or power of a lower power management unit of each of the power management units; and
a state machine that controls the MTCMOS controller,
wherein the MTCMOS controller comprises a floating prevention circuit (FPC) temporarily storing information stored in the MTCMOS controller even when the MTCMOS controller is in a power-off state and outputting the stored information to a lower power management unit of the power management unit having the MTCMOS controller.

3. A power control apparatus comprising:
an active block in which power is maintained in a power-on state; and
an N number of power management units having a hierarchical structure where N is a natural number greater than or equal to 1,
wherein each of the power management units controls power of at least one power domain block, power of a first power management unit of the N number of the power management units is controlled by the active block, and power of an Nth power management unit of the N number of the power management units is controlled by an (N−1)th power management unit,
wherein each of the power management units comprises:
an MTCMOS controller that controls power of the at least one power domain block corresponding to each of the power management units or power of a lower power management unit of each of the power management units; and
a state machine that controls the MTCMOS controller,
wherein each of the power management units comprises a floating prevention circuit (FPC) temporarily storing information stored in each of the power management units when each of the power management units is even in a power-off state and outputting the stored information to the at least one power domain block controlled by each of the power management units.

4. A power control apparatus comprising:
an active block in which power is maintained in a power-on state; and
an N number of power management units having a hierarchical structure where N is a natural number greater than or equal to 1,
wherein each of the power management units controls power of at least one power domain block, power of a first power management unit of the N number of the power management units is controlled by the active block, and power of an Nth power management unit of the N number of the power management units is controlled by an (N−1)th power management unit,
wherein each of the power management units comprises:
an MTCMOS controller that controls power of the at least one power domain block corresponding to each of the power management units or power of a lower power management unit of each of the power management units; and
a state machine that controls the MTCMOS controller,
wherein each of the power management units outputs a request signal requesting information about a state of each of the at least one power domain block to each of the at least one power domain block controlled by each of the power management units, receives a response signal output from each of the at least one power domain block in response to the request signal, and outputs a control signal controlling power of each of the at least one power domain block based on the received response signal.

5. A power control apparatus comprising:
an active block in which power is maintained in a power-on state; and
an N number of power management units having a hierarchical structure where N is a natural number greater than or equal to 1,
wherein each of the power management units controls power of at least one power domain block, power of a first power management unit of the N number of the power management units is controlled by the active block, and power of an Nth power management unit of the N number of the power management units is controlled by an (N−1)th power management unit
wherein each of the power management units comprises:
an MTCMOS controller that controls power of the at least one power domain block corresponding to each of the power management units or power of a lower power management unit of each of the power management units; and
a state machine that controls the MTCMOS controller, wherein, to wake up the at least one power domain block controlled by a lower power management unit of the power management unit having the state machine, the state machine outputs a wake-up signal to the state machine included in the lower power management unit.

6. A power control apparatus comprising:
an active block in which power is maintained in a power-on state; and
an N number of power management units having a hierarchical structure where N is a natural number greater than or equal to 1,
wherein each of the power management units controls power of at least one power domain block, power of a first power management unit of the N number of the power management units is controlled by the active block, and power of an Nth power management unit of the N number of the power management units is controlled by an (N−1)th power management unit,
wherein each of the power management units comprises:
an MTCMOS controller that controls power of the at least one power domain block corresponding to each of the power management units or power of a lower power management unit of each of the power management units; and
a state machine that controls the MTCMOS controller,
wherein, when the power management unit having the state machine enters a power-off state, the state machine outputs a power-off signal to the state machine included in a higher power management unit of the power management unit having the state machine.

7. The power control apparatus of claim 4, wherein the state machine receives the response signal and outputs a first controller control signal to the MTCMOS controller to control the power of each of the at least one power domain block based on the received response signal.

8. The power control apparatus of claim 5, wherein the state machine further outputs a second controller control signal to the MTCMOS controller to wake up the lower power management unit and the MTCMOS controller outputs a second control signal to wake-up the lower power management unit in response to the second controller control signal.

9. A portable terminal comprising:
a power control apparatus comprising:
an active block in which power is maintained in a power-on state; and
an N number of power management units having a hierarchical structure where N is a natural number greater than or equal to 1,
wherein each of the power management units controls power of at least one power domain block, power of a first power management unit of the N number of the power management units is controlled by the active block, and power of an $N^{th}$ power management unit of the N number of the power management units is controlled by an $(N-1)^{th}$ power management unit; and
a CPU receiving power controlled by the power control apparatus,
wherein each of the power management units comprises:
an MTCMOS controller that controls power of the at least one power domain block corresponding to each of the power management units or power of a lower power management unit of each of the power management units; and
a state machine that controls the MTCMOS controller,
wherein the state machine comprises a floating prevention circuit (FPC) that temporarily stores information stored in the state machine when the state machine is even in a power-off state and that outputs the stored information to the active block or a higher power management unit of the power management unit having the state machine.

10. The portable terminal of claim 9, wherein the portable terminal is one of a PDA, cellular phone, media player, wireless computer peripheral, or wireless remote control.

11. A method of controlling a power control apparatus with N number of power management units having a hierarchical structure where N is a natural number greater than 1, the method comprising:
an active block in which power is always maintained in an power-on state waking-up a first power management unit to wake-up at least one first power domain block controlled by the first power management unit; and
the first power management unit waking-up a second power management unit to wake-up at least one second power domain block,
wherein the first power management unit outputs a request signal that requests information about a state of each of the at least one first power domain block to each of the at least one first power domain block controlled by the first power management unit, receives a response signal output from the at least one first power domain block in response to the request signal, and outputs a control signal that controls power of the at least one first power domain block based upon the received response signal.

12. A method of controlling a power control apparatus with N number of power management units having a hierarchical structure where N is a natural number greater than 3, the method comprising:
an $N^{th}$ power management unit outputting a first power-off signal to an $(N-1)^{th}$ power management unit when at least one $N^{th}$ power domain block controlled by the $N^{th}$ power management unit is all powered-off; and
receiving the first power-off signal, and the $(N-1)^{th}$ power management unit outputting a second power-off signal to an $(N-2)^{th}$ power management unit when an $(N-1)^{th}$ power control domain block is all powered-off,
wherein each of the power management units comprises:
an MTCMOS controller that controls power of the at least one power domain block corresponding to each of the power management units or power of a lower power management unit of each of the power management units, and
a state machine that controls the MTCMOS controller,
wherein the state machine comprises a floating prevention circuit (FPC) that temporarily stories information stored in the state machine when the state machine is even in a power-off state and that outputs the stored information to the active block or a higher power management unit of the power management unit having the state machine.

* * * * *